United States Patent [19]
Roth

[11] Patent Number: 5,925,330
[45] Date of Patent: Jul. 20, 1999

[54] METHOD OF M41S FUNCTIONALIZATION OF POTENTIALLY CATALYTIC HETEROATOM CENTERS INTO AS-SYNTHESIZED M41S WITH CONCOMITANT SURFACTANT EXTRACTION

[75] Inventor: Wieslaw J. Roth, Sewell, N.J.

[73] Assignee: Mobil Oil Corporation, Fairfax, Va.

[21] Appl. No.: 09/023,842

[22] Filed: Feb. 13, 1998

[51] Int. Cl.$^6$ .................................................... C01B 33/20
[52] U.S. Cl. ..................... 423/702; 423/705; 423/713; 502/85
[58] Field of Search .................................. 423/702, 705, 423/713; 502/85

[56] References Cited

U.S. PATENT DOCUMENTS

| | | | |
|---|---|---|---|
| 4,335,020 | 6/1982 | Chu et al. ................................. | 502/85 |
| 4,851,200 | 7/1989 | Ryan ......................................... | 502/85 |
| 5,098,684 | 3/1992 | Kresge et al. . | |
| 5,102,643 | 4/1992 | Kresge et al. . | |
| 5,143,879 | 9/1992 | Whitehurst . | |
| 5,145,816 | 9/1992 | Beck et al. . | |
| 5,348,687 | 9/1994 | Beck et al. . | |
| 5,362,695 | 11/1994 | Beck et al. . | |
| 5,364,797 | 11/1994 | Olson et al. . | |
| 5,378,440 | 1/1995 | Herbst et al. . | |
| 5,425,934 | 6/1995 | Malla et al. ............................. | 423/714 |
| 5,622,684 | 4/1997 | Pinnavaia et al. ...................... | 423/701 |

*Primary Examiner*—Mark L. Bell
*Assistant Examiner*—David Sample
*Attorney, Agent, or Firm*—Peter W. Roberts; Malcolm D. Keen

[57] ABSTRACT

A method for modifying a crystalline molecular sieve material is provided. The crystalline molecular sieve material is modified by functionalizing it and concurrently removing its templating surfactant. The method is accomplished by contacting the crystalline molecular sieve material with a treatment composition including a functionalizing agent, an exchanging moiety and a solvent.

20 Claims, No Drawings

METHOD OF M41S FUNCTIONALIZATION OF POTENTIALLY CATALYTIC HETEROATOM CENTERS INTO AS-SYNTHESIZED M41S WITH CONCOMITANT SURFACTANT EXTRACTION

FIELD OF THE INVENTION

This invention relates to a method of modifying ultra-large pore crystalline materials useful as catalysts and sorbents. More specifically, this invention relates to a method of incorporating functional groups into the crystalline material and concurrently recovering a templating surfactant useful in the synthesis of the ultra- large pore crystalline materials.

BACKGROUND OF THE INVENTION

Porous inorganic solids have found great utility as catalysts and separation media for industrial applications. These materials are commonly synthesized by using organic cationic templates in the synthesis mixture. The use of surfactants as organic templates provides porous solids with ultra large pores up to 100 Angstroms. The cost of these templating surfactants in many instances represents a major fraction of the overall cost of the molecular sieve. One method of removing the templating surfactants from the pores of the freshly synthesized molecular sieve material is to subject the as-synthesized molecular sieve to high temperatures in a controlled oxygen-containing atmosphere to slowly burn off the residual organic template. This step is commonly referred to in the art of molecular sieve synthesis as calcining. Unfortunately, calcining destroys the templating surfactant. Moreover, the calcined molecular sieve can be more deformed and/or partially collapsed due to shrinkage caused by high calcination temperatures. Inorganic cations may be removed, either before or after calcining, from the as-synthesized molecular sieve by aqueous ion exchange. However, aqueous ion-exchange techniques have proven largely ineffective for removing the organic templating surfactants from layered and other controlled pore synthetic materials. It would, therefore, be highly desirable to provide a method for the removal and recovery of the templating surfactant which would also preserve the integrity of the molecular sieve.

The porous materials in use today can be sorted into three broad categories using the details of their microstructure as a basis for classification. These categories are 1) amorphous and paracrystalline supports, 2) crystalline molecular sieves and 3) modified layered materials, and have been described in detail in U.S. 5 Pat. No. 5,145,816 to Beck, et al., and U.S. Pat. No. 5,143,879 to Whitehurst, which are incorporated by reference as if set forth at length herein.

Zeolites, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction. These crystalline structures contain a large number of smaller cavities which may be interconnected by a number of still smaller channels or pores. These cavities and pores are uniform in size within a specific zeolitic material. Since the dimensions of these pores provide access to molecules of certain dimensions while rejecting those of larger dimensions, these materials are known as "molecular sieves". These molecular sieves have been utilized in a variety of ways in order to take advantage of their properties.

The precise crystalline microstructure of most zeolites manifests itself in a well-defined X-ray diffraction pattern that usually contains many sharp maxima and that serves to uniquely define the material. Similarly, the dimensions of pores in these materials are very regular, due to the precise repetition of the crystalline microstructure. All molecular sieves discovered to date have pore sizes in the microporous range, which is usually quoted as 2 to 20 Angstroms, with the largest reported being about 12 Angstroms.

One particular area of interest involves anchoring or incorporating functional groups into ultra-large pore crystalline materials in order to engineer unique catalytic sites and/or to tailor the pore size as desired. U.S. Pat. No. 5,145,816 to Beck, et al. describes functionalization of ultra-large pore crystalline materials as-synthesized or after removal of the templating surfactant by calcination. It has been found that the structure of calcined ultra-large pore crystalline materials are more deformed and/or partially collapsed due to structure contraction during calcination. As a result, heat calcined ultra-large pore crystalline materials provide fewer silanol groups available for anchoring functionalizing moieties. Moreover, during removal of templating surfactant by calcination the surfactant is burned off, thus being effectively destroyed. On the other hand, the use of uncalcined, surfactant containing ultra-large pore crystalline material is undesirable because expensive templating surfactant is left in the as- synthesized structure of the ultra-large pore crystalline materials. Moreover, some templating surfactants fill the pores of the as-synthesized molecular sieve, and must be removed to provide access to the pores for catalysis or sorption.

U.S. Pat. No. 5,143,879 to Whitehurst teaches a method of recovering organic templates used to synthesize molecular sieves useful as catalysts and sorbents. The method described in the '879 patent requires elevated temperatures, is applied to non-functionalized ultra-large pore crystalline materials and may provide low recovery yields of removed template at room temperature.

Thus, in light of existing technologies for recovery of templating materials and functionalization of synthetic molecular sieves, such as those discussed above, there exists an ongoing need to develop new and useful catalysts and separation media for industrial applications, which are inexpensive and of considerable benefit from the standpoint of processing.

Accordingly, it is an object of the present invention to provide a method for functionalizing ultra-large pore crystalline material concurrently with recovery of is high yields of templating surfactant.

SUMMARY OF INVENTION

In accordance with the present invention, a method for modifying a crystalline molecular sieve material is provided which includes contacting the crystalline molecular sieve material with a treatment composition containing an ion exchanging moiety, a functionalizing group and a solvent. The contacting is accomplished under conditions sufficient to functionalize the crystalline molecular sieve material and concurrently remove its templating surfactant. The crystalline molecular sieve material includes an inorganic, porous, non-layered crystalline phase material exhibiting, after calcination and/or functionalization, an X-ray diffraction pattern with at least one peak at a d-spacing greater than about 18 Angstrom units with a relative intensity of 100 and having a benzene adsorption capacity of greater that 15 grams benzene per 100 grams anhydrous crystal at 50 torr and 25° C. The treatment composition includes a functionalizing agent, namely M' X' Y'$_n$, wherein:

M' is selected from a group consisting of Periodic Table Groups IIA, IIIA, IVA, VA, VIA, VIIIA, IB, IIB, IIIB, IVB, VB and VIB;

X' is selected from a group consisting of halides, hydrides, alkoxides of 1 to about 18 carbon atoms, alkyl of 1 to 18 carbon atoms, alkenyl of 1 to 18 carbon atoms, aryl of 1 to 18 carbon atoms, aryloxide of 1 to 18 carbon atoms, sulfonates, nitrates and acetates;

Y' is selected from a group consisting of the substituents described for X', amines, phosphines, sulfides, carbonyl and cyanos; and n=1–5.

The exchanging moiety, is preferably a cation donor selected from the group of mineral acid salts, ammonium salts, quaternary ammonium salts or a functionalizing agent capable of being a cation donor. Useful templating surfactants include the group consisting of cetyltrimethylammonium, myristyltrimethylammonium, decyltrimethylammonium, cetyltrimethylphosphonium, octadecyltrimethylphosphonium, benzyltrimethylammonium, cetylpyridinium, dodecyltrimethylammonium, and dimethyldidodecylammonium. Solvents useful for the method of the present invention include alcohols, ethers, amines, halogenated hydrocarbons, carboxylic acid and aromatic or aliphatic ethers.

The crystalline molecular sieve material of the present invention also includes an inorganic, porous crystalline phase material having a hexagonal arrangement of uniformly-sized pores at least about 13 Angstrom units in diameter and exhibiting, after calcination, a hexagonal electron diffraction pattern that can be indexed with a $d_{100}$ value greater than 18 Angstrom Units. The crystalline molecular sieve material useful in the present invention has a composition expressed as follows:

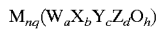

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

The crystalline molecular sieve material of the present invention also includes an inorganic, porous crystalline phase having a composition on an anhydrous basis, expressed as follows:

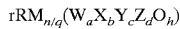

$$rRM_{n/q}(W_aX_bY_cZ_dO_h)$$

wherein R is the total organic material not included in M; r is the number of moles or mole fraction of R; M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1, wherein, when treated under conditions sufficient to remove R, said crystalline phase give an X-ray diffraction pattern with at least one peak at a position greater than about 18 Angstrom Units d-spacing and exhibits a benzene adsorption capacity of greater than about 15 grams benzene per 100 grams anhydrous crystal at 50 torr and 25° C.

The crystalline molecular sieve material of the present invention also includes an inorganic, non-pillared crystalline phase giving an X-ray diffraction pattern following calcination with at least two peaks at positions greater than about 10 Angstrom Units d-spacing, at least one of which is at a position greater than about 18 Angstrom Units d-spacing, and no peaks at positions less than about 10 Angstrom Units d-spacing with relative intensity greater than about 20% of the strongest peak.

As a result of the present invention a novel, cost-effective method is provided for functionalizing as-synthesized ultra large pore zeolites and concurrently recovering a majority of their templating surfactants. In the method of the present invention removal of surfactant prior to final calcination is cost effective, makes the calcination process more manageable and provides zeolites with higher content of silanol groups which are available for anchoring of functionalizing moieties.

Other improvements which the present invention provides over the prior art will be identified as a result of the following description which sets forth the preferred embodiments of the present invention. The description is not in any way intended to limit the scope of the present invention, but rather only to provide working examples of the present preferred embodiments. The scope of the present invention will be pointed out in the appended claims.

DETAILED DESCRIPTION OF THE INVENTION

The method of modifying crystalline molecular sieves and simultaneously removing a templating surfactant found in their as-synthesized state is applicable to a wide range of functional groups and templating surfactants.

A preferred ultra large molecular sieve useful in the method of the present invention is M41 S. The preparation and characterization of the ultra large pore synthetic molecular sieves of the present invention are disclosed in U.S. Pat. Nos. 5,102,643 and 5,057,296 incorporated herein by reference as if set forth in full. Certain forms of M41S are described in U.S. Pat. Nos. 5,098,684 and 5,198,203 and are also incorporated herein by reference as if set forth in full.

The method of the invention takes advantage of a high concentration of hydroxyl groups present in as-synthesized silica based M41 S and other forms of M41 S. Silicious M41 S and MCM-41 are preferred due to convenience, cost, ease of preparation and product quality as judged based upon the number of x-ray diffraction peaks observed (e.g., 34 for MCM-41). Silicious M41S and MCM-41 also have a very high silanol concentration which is available for anchoring functionalizing moieties.

The method of the present invention uses the reaction of hydroxyl groups with a treatment composition comprising M' X' Y'$_n$ to anchor or incorporate functionalizing groups into the ultra large porous material of the invention. Functionalizing groups can provide unique catalytic sites within the pores of synthetic molecular sieves or can act as pore size reducing agents so that the pore size can be tailored as desired. Functionalizing groups may also serve to modify the activity of catalytic sites already present in the molecular sieve material. Functionalizing groups can also serve as precursors to ceramic materials.

A functionalizing group will be understood to be a characteristic reactive, covalently or ionically bonded group of a chemical compound and functionalization will be understood to be the incorporation of covalently or ionically bonded functional groups into the molecular sieve material. The functionalizing group of the present invention includes any moiety that is soluble in the extracting solvent, such as alcohol, and can bind to a silanol group.

The functionalization reaction may be described according to the formula

Si—O—R+M' X'Y'$_n$→SiOM' Y'$_n$+R' Y' wherein Si—O—R' is a site in the lattice of the crystalline material.

R can be H$^+$ or R$_4$N$^+$ which is the organic cation specified in the crystallization methods described hereinbelow.

M' can be elements of Groups IIA, IIIA, IVA, VA, VIA, VIIIA, IB, IIB, IIIB, IVB, VB, or VIB of the Periodic Table of the Elements, (Sargent-Welch Scientific Co. Cat. No. S-18806, 1979). Preferred elements for M' are Groups IVA, VIA, VIIIA, IIIB and IVB, and most preferred elements for M' are titanium, zirconium, chromium, iron, cobalt, nickel, boron, aluminum, and all lanthanides.

X' can be halides, hydrides, alkoxides of 1–6 carbon atoms, alkyl of 1–18 carbon atoms, aryl of 1–18 carbon atoms, acetates, aryloxides of 1–18 carbon atoms, sulfonates and nitrates. Preferred substituents for X' are halides, alkoxides of 1–6 carbon atoms and acetates.

Y' can be selected from the substituents described for X', or amines, phosphines, sulfides, carbonyls and cyanos. Preferred substituents for Y' are those described for X', amines, sulfides and alkyls with 1–18 carbon atoms. Most preferred substituents for Y' are those described for X', amines and alkyls with 1–18 carbon atoms; n=1–5.

Nonlimiting examples for M' X' Y'$_n$ include chromium acetate, chromium nitrate, tetraethylorthosilicate, tetramethylorthosilicate, titanium tetraethoxide, aluminum isopropoxide, aluminum tri-sec butoxide, aluminum di-isopropoxide acetoacetic ester chelate, hexamethyldisilazane, di-sec-butoxyaluminoxytriethoxysilane, diethylphosphatoethyltriethyoxysilane, trimethylborate, chlorodimethylalkylsilane wherein alkyl has 1–18 carbon atoms, ammonia-borane, borane-tetrahydrofuran and dimethylsulfide-dibromoborane.

The treated crystalline molecular sieve material can be used as is or may be further subjected to a thermal treatment or treatment with a reactive gas such as oxygen or carbon monoxide for activation.

The treated crystalline material may be described as having functionalizing groups within it according to the formula

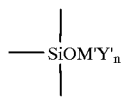

These functionalized sites may be, for example:

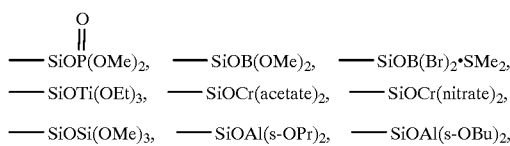

-continued

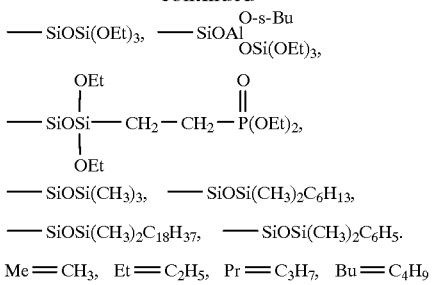

—SiOSi(CH$_3$)$_3$, —SiOSi(CH$_3$)$_2$C$_6$H$_{13}$,

—SiOSi(CH$_3$)$_2$C$_{18}$H$_{37}$, —SiOSi(CH$_3$)$_2$C$_6$H$_5$.

Me = CH$_3$, Et = C$_2$H$_5$, Pr = C$_3$H$_7$, Bu = C$_4$H$_9$

In these examples, —Si represents a site in the lattice of the crystalline material. Two additional bonds on the Si are not shown. The invention is not limited to the above listed functionalized sites.

The method of the present invention also includes removal of the templating surfactant found in as-synthesized ultra large porous material of the invention. Most importantly, the functionalizing of the ultra large porous material and the removal of the templating surfactant occur concurrently in a one-step method thereby providing a cost effective and efficient manner of recovering and recycling the more expensive component of the functionalized catalyst or sorbent formed by the method of the present invention.

The functionalizing agent may be incorporated into the treatment composition in an amount from about 0.01% to about 60% by weight based upon the total weight of the treatment composition, preferably from about 1.0% to about 30.0% by weight based upon the total weight of the treatment composition.

Templating Surfactants

As used herein, a templating surfactant refers to an organic templating or directing agent found in the as-synthesized ultra large porous material of the present invention. For a discussion of zeolite directing agents, see R. Szostak's book entitled "Molecular Sieves, Principles of Synthesis and Identification" 79 (1989), which is incorporated herein by reference as if set forth in full.

Templating of surfactants substantially fill pores of as-synthesized molecular sieves, and must be removed to provide access to the pores for catalysis or sorption. A nonlimiting list of bulky organic bases which are favored as templating surfactants include cetyltrimetylammonium (CTMA), myristyltrimethylammonium (C$_{14}$TMA), decyltrimethylammonium, cetyltrimethylphosphonium, octadecyltrimethylphosphonium, benzyltrimethylammonium, cetylpyridinium, dodecyltrimethylammonium, and dimethyldidodecyclammonium, merely to name a few. The templating action of various organic entities is also discussed in A. Dyer "An Introduction to Zeolite Molecular Sieves" 60 (1988), as well as in B. M. Lok et al., "The Role or Organic Molecules in Molecular Sieve Synthesis" 3 Zeolites 282 (1983), which are incorporated by reference as if set forth at length herein.

Extraction Solvents

The extraction solvent of the invention is a treatment composition which is suitable to solubilize at least one exchanging moiety, preferably a cation donor and one functionalizing group which may be the same moiety as the exchanging moiety. Solvents which have the required properties include both aromatic as well as aliphatic ethers (e.g., tetrahydrofuran), alcohols, amines, halogenated hydrocarbons, carboxylic acids and other polar solvents. The exchanging moiety can be provided by inorganic acids or salts, such as ammonium salts. In a preferred embodiment, the water content of the extraction solvent is relatively low only to the extent that facilitates solubilization of the exchanging moiety and/or functionalizing group. Most preferably the extraction solvent is substantially free of water. The most preferred solvent is an alcohol such as ethanol.

The efficiency of extraction of a templating surfactant from the as-synthesized material is believed to be related to several factors. While not to limit the invention by a recitation of theory, one of the most important factor appears to be the ability of the solvent used for the extraction to solubilize the template or its salt, to interact favorably with the surface and to disrupt oleophilic interactions between moieties of templates with each other and with the surface of the material.

Moreover, the solvent must also have the ability to solubilize the functionalizing group and the exchanging moiety.

Extraction solvents useful for the method of the invention include: methanol, ethanol, benzene, toluene, heptene, diethylether, chloroform, tricholoroethylene, heptene/ethanol (52/48 wt/wt).

It has been found that these solvents can, in some instances, be made even more effective by adding co-solvents such as aliphatic or aromatic hydrocarbons. Most preferred are solvents which boil below about 150° C. Particularly, solvents which boil below about 150° C. have been found to facilitate both recovery of the templating surfactant as well as recycle of the solvent. In accordance with the present invention, it has been found that certain isotropic solvent mixtures having a particular set of the solubility, hydrophilic and oleophilic properties, are usually effective for extracting organic surfactants from an as-synthesized zeolite. Alcohols are particularly preferred for forming isotropic solvent mixtures.

Isotropic solvent mixtures useful as extraction solvents in the method of the present invention include the following: hexane/methanol (73/27); hexanelethanol (73/27); hexane/n-propanol (96/4); heptene/methanol (48/52); heptene/ethanol (52/48); heptene/n-butanol (82/18); cyclohexane/isopropyl (67/33); benzene/methanol (60/40); benzene/ethanol (68/32); toluene/methanol (72/28); toluene/ethanol (68/32); trichlorethylene/methanol (64/36); trichlorethylene/ethanol (73/27).

Exchanging Moiety

To complete the process of extraction of the templating surfactant, it is essential that an exchanging moiety, preferably a cation donor, be available in the treatment composition. The cation donor can replace the ionic interactions of the surfactant with the hydroxyl groups on the surface. Thus, a cation donor is required which is readily soluble in the treatment composition of the present invention. For example, as shown in Examples 38 and 39 of U.S. Pat. No. 5,143,879 to Whitehurst in an organic solution in the absence of a cation donor no extraction of the templating surfactants could take place.

If the functionalizing group is not itself cationic the most preferred cation donors are ammonium salts, quaternary ammonium salts, and quaternary amine salts. Proton donors such as mineral acid are less desirable because protons are likely to compete favorably with the functionalizing group for the anchoring site.

Addition of the cation donor in accordance with the present invention improves template recovery and is believed to preserve hydroxyl content. While not presented to limit the scope of the invention by a recitation of theory, it is believed that such preservation of hydroxyl content results in the observed improvement in ion exchange and chemical bonding of materials prepared in accordance with the present invention when compared with materials which have been calcined to remove the organic directing agent.

The relationship among functional groups, extraction solvent and cation donor is the most important aspect of the present invention. As used herein "conditions sufficient to modify the crystalline molecular sieve material" refers to the unique relationship among functionalizing agent, extraction solvent and cation donor of the present invention. Additionally, the ratio of treatment composition to treated crystalline molecular sieve material, duration of treatment and temperature are not critical and may vary within wide limits. The temperature may be, for example, from about −70° C. to about 250° C., with from about 25° C. to about 100° C. preferred; and the time may be from about 0.1 to about 100 hours, with from about 0.1 to about 30 hours preferred and from about 0.1 to about 24 hours most preferred. It has been found that whenever a functionalizing agent is an ionic compound, then the particular functionalizing agent also acts as cation donor useful to ion exchange the surfactant. In that case, it is essential that the extraction solvent is a polar organic solvent, preferably alcohol.

Inorganic polar solvents such as water and the like must be avoided because by themselves, they cannot be used to remove templating surfactants. For example, attempts to utilize water as an extraction solvent have yielded poor results. In that regard, see Example 7 herein below. It has also been found that whenever the functionalizing agent is a nonionic compound, then it is essential that the extracting solvent is a polar organic solvent, preferably alcohol which also contains a cation donor, preferably a proton precursor. For example, certain metal containing functional groups, such as those containing a lanthanide can also serve as the cation donor which is essential for the recovery of the templating surfactant. If a functional group is neutral such as an alkoxide, then the extraction solvent must include another cation donor such as ammonium acetate which is essential in order to ion exchange the templating surfactant.

The exchanging moiety may be incorporated into the treatment composition in an amount from about 0.1% to about 50% by weight based upon the total weight of the treatment composition, preferably from about 1.0% to about 25.0% by weight based upon the total weight of the treatment composition.

After treatment, the exchanging moiety can be separated from the templating surfactant. The templating surfactant can then be recycled.

EXAMPLES

The following examples serve to provide further appreciation of the invention, but are not meant in any way to restrict the effective scope of the invention. In the examples below, percentages are by weight unless otherwise indicated. The materials used in these examples have either been synthesized as described below or are readily commercially available.

Example 1

In this example, siliceous MCM-41, an ultra large pore crystalline material was prepared. 170 grams of Ultrasil precipitated silica, 200 grams of 25% tetramethylammonium hydroxide (TMA-OH) and 600 grams of water were reacted at 100° C. for one hour. Subsequently, 375 grams of a 37% solution of dodecyltrimethylammonium chloride (DTMA-Cl) was added to the resulting mixture and was reacted at 150° C. for twenty hours.

The resulting solid product was recovered by filtration and dried in air at 110° C. temperature. The X-Ray diffraction pattern of the as-synthesized product exhibited a three-peak hexagonal pattern of MCM-41 with d-spacing of the first line at 37 Angstrom units as described in U.S. Pat. No. 5,098,684 to Kresge, et al. Similarly, after calcination, a three-peak X-Ray diffraction pattern indicative of MCM-41 (36), wherein the number in parentheses is the d-spacing of the first line in x-ray pattern was obtained. The as-synthesized product had the following percent by weight composition: 41% ash (essentially, all silica), 22.2 % C, 1.72% N and a negligible amount of alumina. The resulting material had a BET surface area of 1095 $m^2/g$, and an adsorption capacity for water and cyclohexane of 10 g and more than 50 grams per 100 grams of sorbate, respectively.

Example 2

In this example, the as-synthesized compound of Example 1 was functionalized with aluminum. A solution of 14.4 grams of ammonium acetate in 200 ml of ethanol was combined with 15 grams of aluminum di-isopropoxide acetoacetic ester chelate in 85 grams of ethanol. 10 grams of the as-synthesized MCM-41 compound prepared in Example 1 was slurried in the previously prepared solution of ammonium acetate and ester chelate. The resulting mixture was heated at 60° C. overnight. A solid product was recovered by filtration and was air dried. The yield of the solid product was 6.08 g. The product had the following percent composition: 75.4% ash (essentially all silica and alumina), 6.6% C, 0.64% N and 13.6% $Al_2O_3$. The composition of this product indicated that aluminum had been successfully inserted into the MCM-41 (36) porous matrix and the DTMA-Cl templating surfactant had been successfully removed. It was estimated that from about at least 70% up to about 99% of the templating surfactant was removed in this experiment. The subsequently calcined product exhibited a BET surface area of 880 $m^2/g$, and sorption for water and cyclohexane of 46.5g/100 g and 36g/100 g sorbate, respectively.

Example 3

MCM 41 as synthesized in Example 1 was functionalized with tetraethyl ortho-silicate (TEOS). A solution was prepared by combining 14.4 grams of ammonium acetate in 200 ml of ethanol with 10 grams of TEOS. The resulting solution was mixed with 10 grams of MCM 41 as synthesized in Example 1 to form a slurry. The resulting mixture was heated overnight at 60° C. A solid product was recovered by filtration and air dried. The yield of the solid product was 7.64 g. The product had the following percent by weight composition: 86.1% ash, 5.73% C, 0.27% N. A subsequently calcined product exhibited a BET surface area of 796 $m^2/g$, and sorption for water of 32g/100 g sorbate. The decreased BET value indicated that the pore volume of the as-synthesized MCM-41 had been reduced as a result of functionalizing with TEOS. Moreover, the decrease in carbon and nitrogen contents indicated that DTMA-Cl templating surfactant had been successfully removed. Based on the above present composition, it was estimated that from at least 85% to about 99% of DTMA-Cl had been removed.

Example 4

Siliceous MCM 41, a species of M41 S, was synthesized according to the procedure set forth below. 150 grams of Ultrasil precipated silica, 150 grams of 25% TMA-OH and 500 grams of water were reacted in a steambox for one hour. 400 grams of a 29% solution of cetyltrimethylammonium chloride (CTMA-Cl) was added and the resulting mixture was reacted at 150° C. for six hours.

The resulting product was recovered by filtration and dried in air at 110° C. The X-Ray diffraction pattern of the as-synthesized product exhibited a four-peak hexagonal pattern of MCM-41 with d-spacing of the first line at 45 Å. The as-synthesized product had the following percent by weight composition: 35.8% ash, 24.5% carbon, 1.41% nitrogen. After calcination, a 4-peak X-Ray diffraction pattern indicative of MCM-41(40) was obtained. The resulting material had a BET surface area of 1069 $m^2/g$ and an adsorption capacity for water of 10 grams/100 grams sorbate.

Example 5

MCM 41 as-synthesized in Example 4 was functionalized with Zr-hydroxychloride ($ZrOCl_2$). 10 grams of the compound prepared in Example 4 was slurried in a solution consisting of 20 grams of aqueous $ZrOCl_2$ solution (20% $ZrO_2$) and 60 ml of ethanol.

The resulting mixture was heated overnight at 60° C. A solid product was recovered by filtration and dried at 100° C. The solid product had a yield of 5.91 g. The product contained 66.3% solids including 6.6% Zr. The zirconium functionalized MCM 41 product had a BET surface area of 938 $m^2/g$. A decreased BET value and a high zirconium content indicated that the ultra large pore material had been successfully functionalized with zirconium, It is well known that in solution $ZrOCl_2$ forms cationic oxychloro clusters. The reduced ratio of % carbon/% solids after the treatment (0.5 after treatment vs. 0.8 before treatment) is indicative of considerable surfactant removal.

Example 6

In this experiment cerium, a lanthanide, was inserted into an ultra large pore crystalline material. The cerium containing compound was also used to generate the cation donor necessary for displacement of the templating surfactant present in the as-synthesized MCM 41.

20 grams of as-synthesized MCM 41 prepared in Example 4 was slurried overnight at 60 in a solution containing 10 grams of cerium nitrate hexahydrate in 100 ml of ethanol. The solid product was recovered by filtration and dried at 100° C. A yield of 11.43 grams was obtained. The functionalized product had the following composition by weight: 66% ash, 14.9% cerium, 16.6% carbon and 3.31% nitrogen. The BET surface area of the calcined functionalized product was 848 $m^2/g$. The high concentration of cerium and decreased BET value indicated that MCM41 had been successfully functionalized with cerium. Additionally, a significantly decreased carbon content evidenced successful removal of CTMA-Cl, the templating surfactant utilized in the synthesis of MCM-4 1.

Example 7

M41S, synthesized as in Example 4 above, and containing 52.2% solids, 20 7.03% alumina, 24.4% carbon, 2.07% nitrogen was treated in separate experiments with ethanol and water. In a first experiment, 10 grams of the as-synthesized M41 S was treated with a solution of 20 grams of cerium nitrate in 100 mL of ethanol and stirred overnight at room temperature. In a second experiment, another 10 gram sample of the same M41 S was treated with a solution of 20 grams of cerium nitrate in 100 ml of water and stirred over night at room temperature.

The product recovered after filtration and drying from the first experiment contains 77% solids, 8.89% carbon and 2.19% nitrogen. The product recovered from the second experiment contains 63% solids, 19.6% carbon and 3.67% nitrogen. The percent surfactant retention is estimated by obtaining the ratio of percent carbon/percent solids. The surfactant rate of retention was 0.11 for the first experiment and 0.3 for the second experiment. These results indicate that by using an organic solvent such as ethanol it is possible to extract the templating surfactant at least 3 times more efficiently than if an aqueous solvent such as water were used.

Example 8

In this example, a sample of ultra large pore crystalline material was functionalized with aluminum nitrate which was also used as a cation donor as required for the extraction of the templating surfactant from the as-synthesized zeolite.

20 grams of MCM 41 as prepared in Example 4 was slurried overnight at 60° C. in a solution containing 10 grams of aluminum nitrate nonahydrate in 200 ml of ethanol. The solid product was recovered by filtration and dried at 100 C. The product had a yield of 10.4 grams and the following composition by weight percent: 74% ash, 4.7% alumina, 13.9% carbon and 2.21% nitrogen. The calcined compound had a BET surface area of 934 $m^2$/g. When comparing the weight percent composition and BET values of the functionalized and as-synthesized MCM 41 compound, it is readily apparent that the functionalization with aluminum was successful. Similarly, a significant decrease in the carbon content indicated successful removal of CTMA, the templating surfactant used to prepare MCM 41.

Example 9

This example demonstrates that if no exchanging moiety, such as a cation donor, is used in the extracting solvent, the efficiency of surfactant removal decreases dramatically.

M41 S was prepared by neutralizing a 400 grams water solution including 250 grams sodium silicate (28.8% silica, 8.8% $Na_2O$) with 125 grams water solution containing 16 grams of concentrated sulfuric acid. A 37% w/w DTMA-Cl solution in 425 grams of water was added to the previously prepared mixture. The resulting mixture was reacted at 100° C. for 24 hours followed by another period of 24 hours at 150° C. The product recovered after filtration and drying showed a solid content, which was virtually all silica, of 27.3% solids, 1.37% nitrogen and 17% carbon. 15 grams of the foregoing solid was contacted with 200 ml of isopropanol for 2 hours at 60° C. 7.06 grams of the resulting product was isolated and contained 54.1% solids, 2.18% nitrogen, 26.0% carbon. The % surfactant retention was estimated by taking the following formula:

R=(% N/% solids after treatment)/(%N/% solids before treatment) The percent surfactant retention for the previously prepared product was estimated to about 78%.

When the treatment was carried out by adding 20 grams of ammonium chloride salt as the cation doner to isopropanol under milder conditions of room temperature, the product recovered (7.19 gram) contained 53.6% solids, 1.34% nitrogen and 16.3% carbon. The surfactant retention factor was decreased to about 49%. The latter surfactant retention value was further reduced to less that 20% by addition of water which caused complete solubilization of ammonium chloride in the exchanging solution.

Thus, the preferred embodiments of the present invention have been described, further changes and modifications can be made by those skilled in the art without departing from the true spirit of the invention, and it is intended to include all such changes and modifications as come within the scope of the claims set forth below.

What is claimed:

1. A method for modifying a crystalline molecular sieve material which contains a templating surfactant which comprises:

contacting said crystalline molecular sieve material with a treatment composition which comprises a functionalizing agent, an exchanging moiety and a solvent, said solvent capable of dissolving said exchanging moiety and said functionalizing agent, said contacting under conditions sufficient to modify said crystalline molecular sieve material, said modifying comprising functionalizing said molecular sieve material and concurrently removing said templating surfactant from said crystalline molecular sieve material.

2. The method of claim 1, wherein said crystalline molecular sieve material comprises:

an inorganic, porous, non-layered crystalline phase material exhibiting, after calcination and/or functionalization, an X-ray diffraction pattern with at least one peak at a d-spacing greater than about 18 Angstrom Units with a relative intensity of 100 and having a benzene adsorption capacity of greater than 15 grams benzene per 100 grams anhydrous crystal at 50 torr and 25° C.

3. The method of claim 1, wherein said solvent is selected from the group consisting of alcohols, ethers, amines, halogenated hydrocarbons, carboxylic acids and aromatic, aliphatic ethers or mixtures thereof.

4. The method claim 1, wherein said solvent comprises an isotropic mixture of at least two components.

5. The method of claim 1, wherein said functionalizing agent comprises M' X' Y'$_n$, wherein:

M' is selected from a group consisting of Periodic Table Groups IIA, IIIA, IVA, VA, VIA, VIIIA, IB, IIB, IIIB, IVB, VB and VIB;

X' is selected from a group consisting of halides, hydrides, alkoxyides of 1 to about 6 carbon atoms, alkyl of 1 to 18 carbon atoms, alkenyl of 1 to 18 carbon atoms, aryl of 1 to 18 carbon atoms, aryloxide of 1 to 18 carbon atoms, sulfonates, nitrates and acetates;

Y' is selected from a group consisting of the substituents described for X', amines, phosphines, sulfides, carbonyl and cyanos; and n=1–5.

6. The method of claim 5, wherein M' X' Y'$_n$ is selected from a group consisting of chromium acetate, chromium nitrate, tetraethylorthosilicate, tetramethylorthosilicate, titanium tetraethoxide, aluminum isopropoxide, aluminum di-isopropoxide acetoacetic ester chelate, aluminum tri-secbutoxide, aluminum nitrate, Zr-hydroxychloride, cerium nitrate, hexamethyldisilazane, di-secbutoxyaluminoxytriethoxysilane, diethylphosphatoethyltriethoxysilane, trimethylborate, chlorodimethylalkylsilane wherein alkyl is $C_{1-18}$, ammonia-borane, borane-tetrahydrofuran, dimethylsulfidedibromoborane and mixtures thereof.

7. The method of claim 1, wherein said treatment composition comprises from about 0.01% by weight to about 60% by weight of said functionalizing agent.

8. The method of claim 7, wherein said treatment composition comprises from about 1.0% by weight to about 30.0% by weight of said functionalizing agent.

9. The method of claim 1, wherein said exchanging moiety is selected from the group consisting of mineral acid salts, ammonium salts, quaternary ammonium salts and a functionalizing agent capable of being a cation donor.

10. The method of claim 1, wherein said treatment composition comprises from about 0.1% by weight to about 50% by weight of said exchanging moiety.

11. The method of claim 10, wherein said treatment composition comprises from about 1.0% by weight to about 25.0% by weight of said exchanging moiety.

12. The method of claim 1, wherein said templating surfactant is selected from the group consisting of cetyltrimethylammonium, myristyltrimethylammonium, decyltrimethylammonium, cetyltrimethylphosphonium, octadecyltrimethylphosphonium, benzyltrimethylammonium, cetylpyridinium, dodecyltrimethylammonium, and dimethyldidodecylammonium.

13. The method of claim 1, wherein said crystalline molecular sieve material is contacted with said treatment composition in the absence of calcination.

14. The method of claim 1, wherein said conditions comprise a temperature from about 0° C. to about 150° C.

15. The method of claim 1, wherein said crystalline molecular sieve material comprises an inorganic, porous crystalline phase material having a hexagonal arrangement of uniformly-sized pores at least about 13 Angstrom Units in diameter and exhibiting, after calcination, a hexagonal electron diffraction pattern that can be indexed with a $d_{100}$ value greater than 18 Angstrom Units.

16. The method of claim 1, wherein said crystalline molecular sieve material has a composition expressed as follows:

$$M_{n/q}(W_a X_b Y_c Z_d O_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

17. The method of claim 1, wherein said crystalline molecular sieve material has a composition on an anhydrous basis, expressed as follows:

$$rRM_{n/q}(W_a X_b Y_c Z_d O_h)$$

wherein R is the total organic material not included in M; r is the number of moles or mole fraction of R; M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1, wherein, when treated under conditions sufficient to remove R, said crystalline phase give an X-ray diffraction pattern with at least one peak at a position greater than about 18 Angstrom Units d-spacing and exhibits a benzene adsorption capacity of greater than about 15 grams benzene per 100 grams anhydrous crystal at 50 torr and 25° C.

18. The method of claim 1, wherein crystalline molecular sieve material comprises an inorganic, non-pillared crystalline phase giving an X-ray diffraction pattern following calcination with at least two peaks at positions greater than about 10 Angstrom Units d-spacing, at least one of which is at a position greater than about 18 Angstrom Units d-spacing, and no peaks at positions less than about 10 Angstrom Units d-spacing with relative intensity greater than about 20% of the strongest peak.

19. The method of claim 1, further comprising separating said templating surfactant.

20. The method of claim 1, further comprising separating said exchanging moiety from said templating surfactant for recycling.

* * * * *